US012160040B2

(12) United States Patent
Zhao et al.

(10) Patent No.: US 12,160,040 B2
(45) Date of Patent: Dec. 3, 2024

(54) ISOLATION BETWEEN ANTENNAS

(71) Applicant: NOKIA TECHNOLOGIES OY, Espoo (FI)

(72) Inventors: Huaicheng Zhao, Zhejiang (CN); Yuanhao Wang, Zhejiang (CN); Hao Wang, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 162 days.

(21) Appl. No.: 18/011,657

(22) PCT Filed: Jun. 24, 2020

(86) PCT No.: PCT/CN2020/098219

§ 371 (c)(1),
(2) Date: Dec. 20, 2022

(87) PCT Pub. No.: WO2021/258362

PCT Pub. Date: Dec. 30, 2021

(65) Prior Publication Data

US 2023/0261372 A1 Aug. 17, 2023

(51) Int. Cl.
*H01Q 1/52* (2006.01)
*H01Q 9/04* (2006.01)
*H01Q 21/06* (2006.01)

(52) U.S. Cl.
CPC ............. *H01Q 1/523* (2013.01); *H01Q 9/045* (2013.01); *H01Q 21/065* (2013.01)

(58) Field of Classification Search
CPC ...... H01Q 1/523; H01Q 9/0435; H01Q 9/045; H01Q 9/0457; H01Q 21/0006; H01Q 21/061; H01Q 21/065; H01Q 21/24
See application file for complete search history.

(56) References Cited

U.S. PATENT DOCUMENTS 8,102,330 B1 * 1/2012 Albers ..................... H01Q 5/40 343/756
10,141,640 B2 11/2018 Howard
(Continued)

FOREIGN PATENT DOCUMENTS

CN 207 967 321 U 10/2018
CN 108777353 A 11/2018
CN 110247176 A 9/2019

OTHER PUBLICATIONS

Zhou, Zhao et al., "Design and Analysis of a Wideband Multiple Microstrip," IEEE Antennas and Wireless Propagation Letters, vol. 18, No. 4, Apr. 30, 2019, pp. 722-725.
International Search Report and Written Opinion dated Mar. 22, 2021 corresponding to International Patent Application No. PCT/CN2020/098219.
(Continued)

*Primary Examiner* — Jason M Crawford
(74) *Attorney, Agent, or Firm* — SQUIRE PATTON BOGGS (US) LLP

(57) ABSTRACT

Embodiments of the present disclosure relate to improvement on isolation between antennas and provide an antenna, an antenna array comprising the antenna and a communication device comprising the antenna array. The antenna comprises an improved feeding network. The feeding network comprises: first and second ports each configured to transmit and/or receive a signal; first and second feed lines coupled in parallel between the first and second ports and formed into a continuous conductive loop; and first and second feeders each arranged to couple to a first node on the first feed line and to a radiating element of the antenna, and third and fourth feeders each arranged to couple to a second node on the second feed line and to the radiating element.

13 Claims, 7 Drawing Sheets

(56) References Cited

U.S. PATENT DOCUMENTS

| | | | | |
|---|---|---|---|---|
| 10,944,172 | B1 * | 3/2021 | Tehran | H01Q 1/246 |
| 2004/0239567 | A1 | 12/2004 | Van der Poel | |
| 2007/0052587 | A1 * | 3/2007 | Cheng | H01Q 5/378 343/700 MS |
| 2009/0009417 | A1 * | 1/2009 | Matsushita | H01P 1/161 343/770 |
| 2015/0188240 | A1 * | 7/2015 | Eom | H01Q 21/28 343/853 |
| 2020/0028267 | A1 | 1/2020 | Foo | |
| 2020/0059008 | A1 | 2/2020 | Zhao et al. | |
| 2023/0261372 | A1 * | 8/2023 | Zhao | H01Q 9/045 343/893 |

OTHER PUBLICATIONS

Extended European Search Report dated Jun. 5, 2024 corresponding to European Patent Application No. 20941676.7.

Haq Nawaz et al., "Double-Differential-Fed, Dual-Polarized Patch Antenna with 90 dB Interport RF Isolation for a 2.4 GHz In-Band Full-Duplex Transceiver," IEEE Antennas and Wireless Propagation Letters, vol. 17, No. 2, Feb. 1, 2018, pp. 287-290, XP011676710.

Haq Nawaz et al., "A compact proximity-fed 2.4 GHz monostatic antenna with wide-band SIC characteristics for in-band full duplex applications," International Journal of RF and Microwave Computer-Aided Engineering, Wiley Interscience, vol. 30, No. 3, Dec. 11, 2019, XP072010742.

Xian-Jing Lin et al., "High Isolation Dual-Polarized Patch Antenna with Hybrid Ring Feeding," International Journal of Antennas and Propagation, vol. 2017, May 3, 2017, pp. 1-6, XP093165330.

* cited by examiner

ISOLATION BETWEEN ANTENNAS

FIELD

Embodiments of the present disclosure generally relate to the field of telecommunication and in particular, to an antenna, an antenna array comprising the antenna and a communication device comprising the antenna array.

BACKGROUND

A high isolation, in other words a target isolation above a predefined threshold, between antennas will improve an antenna's anti-interference ability, especially for multi-input multi-output (MIMO) antennas in the fifth generation (5G) mobile communication systems. It is important in a multi-antenna environment that each antenna does not significantly electromagnetically and/or galvanically couple to another antenna and so affect the other antenna such that its performance is degraded. Currently, orthogonally polarized antenna elements (AEs) are used in most base transceiver stations (BTSs). As the distance of two adjacent AEs in an antenna array is fixed, isolation is only changed by rotating the antenna in place. Thus, two orthogonally polarized antennas have minimized the isolation, and it is difficult to further improve the isolation by changing position of antennas with constant distance.

With the increased number of AEs in a 5G antenna array, there is a big challenge to obtain a high isolation between the AEs. On the other hand, a higher isolation is always required to improve performance of the whole system.

SUMMARY

In general, example embodiments of the present disclosure provide an antenna, an antenna array and a communication device.

In a first aspect, there is provided an antenna. The antenna comprises: a radiating element; and a feeding network coupled with the radiating element. The feeding network comprises: first and second ports each configured to transmit and/or receive a signal; first and second feed lines coupled in parallel between the first and second ports and formed into a continuous conductive loop; and first and second feeders each arranged to couple to a first node on the first feed line and to the radiating element, and third and fourth feeders each arranged to couple to a second node on the second feed line and to the radiating element.

In a second aspect, there is provided an antenna array. The antenna array comprises a plurality of antennas according to the first aspect.

In a third aspect, there is provided a communication device. The communication device comprises the antenna array according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
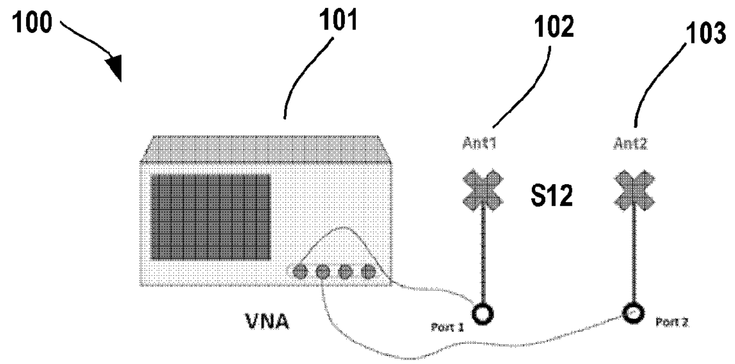
FIG. 1 illustrates a diagram of a measurement of an isolation between antennas.

Principle of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile device or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as, but not limited to, fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT), Industrial Internet of Things (IIoT), Internet of Things (IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. In addition, the term "communication network" may also refer to non-cellular communications network, such as, but not limited to, Bluetooth (BT), Wireless Local Area Network (WLAN) and so on. The communications may include direct device to device communication, e.g. (a) base station node to base station node, or (b) mobile device to mobile device, without any interaction of a mobile device (in case a) or a base station (in case b). Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "communication device" refers to a network device or a terminal device in a communication network. The term "network device" refers to a node in the communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a mobile device, a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The term "mobile device" refers to a device capable of being moved from point A to point B by any means, for example and not limited to: by hand, by carrying, by vehicle (driving, flying, sailing/floating in a liquid, etc), by being worn by a user of the mobile device.

In addition, the term "communication device" may also refer to fixed or stationary electronic communication devices, e.g. base station nodes, which are devices which are fixed in place and do not move.

As mentioned above, a high isolation between antennas can improve the antenna's anti-interference ability. FIG. 1 illustrates a diagram 100 of a measurement of an isolation between antennas. An isolation between antennas is a measure of how tightly coupled the antennas are. As shown, an isolation S12 between antennas 102 and 103 can be measured with a vector network analyzer (VNA) 101 via a port 1 of the antenna 102 and a port 2 of the antenna 103. For example, the isolation S12 may refer to the ratio of signal power received by port 1 to that transmitted by port 2. It is merely an example, and any other suitable ways are also feasible to measure the isolation.

The main factor affecting the isolation is the mutual coupling between the antennas 102 and 103. It applies for two AEs in an antenna array as well. For AEs on the same array, the isolation between them is expected to be as high as possible. A design goal is to have as high an isolation between antennas as possible so that this can improve the antenna's anti-interference ability, especially for 5G MIMO antenna. It is therefore a target to maximize antenna isolation, and this can be even more important than antenna gain in some antenna performance requirements.

Figure 2:
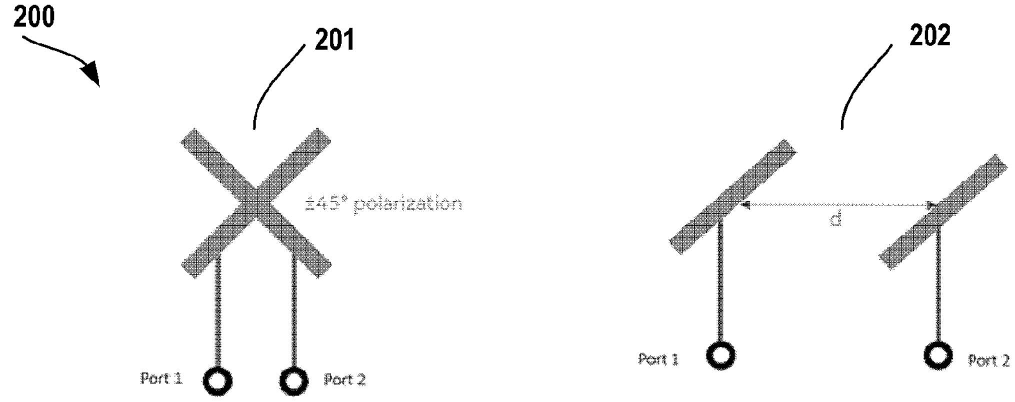
FIG. 2 illustrates a diagram of two types of isolation.
Figure 3:
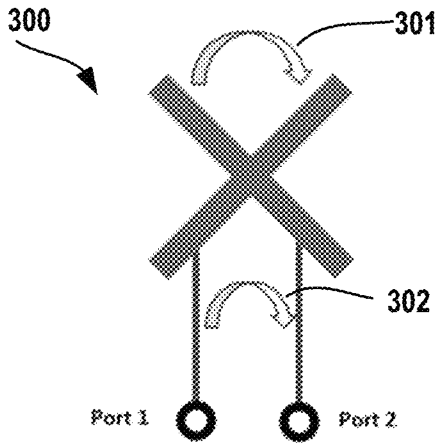
FIG. 3 illustrates a diagram of the mutual coupling of two orthogonal polarized antennas.

FIG. 2 illustrates a diagram 200 of two types of isolation. One type is an isolation of two different polarizations as shown by 201, and the other type is an isolation of the same polarization as shown by 202. The isolation of the same polarization mainly depends on the distance d between the two antennas, as shown by 202. The isolation between two orthogonally polarized antennas, as shown by 201, mainly involves the mutual coupling between the antennas and that between the feeding networks. FIG. 3 illustrates a diagram 300 of the mutual coupling of two orthogonally polarized antennas. As shown, reference sign 301 denotes the mutual coupling between antennas, and reference sign 302 denotes the mutual coupling between feeding networks. The feeding networks will be described later.

As well known, the coupling of two orthogonally polarized antennas is the smallest. Thus, the orthogonally polarized AEs are commonly used in a BTS. However, it's difficult to obtain an increase of isolation by changing position of antennas with constant distance. In current 5G antenna arrays, the number of AEs are up to 192, in an embodiment, but there could be more in some embodiments. For millimetre wave products, there could be 256 AEs. As the number of AEs increases the isolation will become much worse, so the problem of achieving a high enough isolation (above a predefined threshold) becomes more difficult as the number of AEs increases. On the other hand, a higher isolation is always required to increase performance of the whole system.

In order to at least in part solve above and other potential problems, example embodiments of the present disclosure provide an antenna with an improved feeding network. The improved feeding network comprises first and second ports each configured to transmit and/or receive a signal, and first and second feed lines coupled in parallel between the first and second ports and formed into a continuous conductive loop. With the continuous conductive loop design, a high isolation between first and second ports are obtained.

The improved feeding network further comprises first and second feeders each arranged to couple to a first node on the first feed line and to a radiating element of the antenna, and third and fourth feeders each arranged to couple to a second node on the second feed line and to the radiating element. In this way, first to fourth feeders are simultaneously fed, and a beampattern of two polarizations is facilitated to be kept a very good consistency while a high isolation above a predetermined threshold is provided.

Figure 4A:
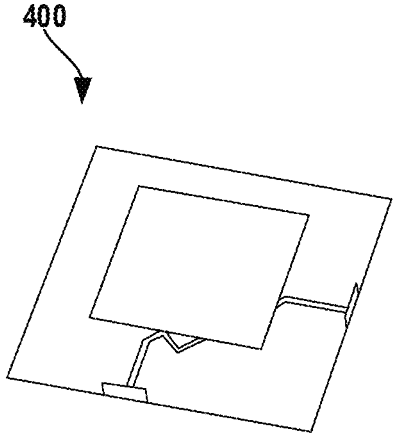
FIG. 4A illustrates a perspective view of an antenna according to some example embodiments of the present disclosure.
Figure 4B:
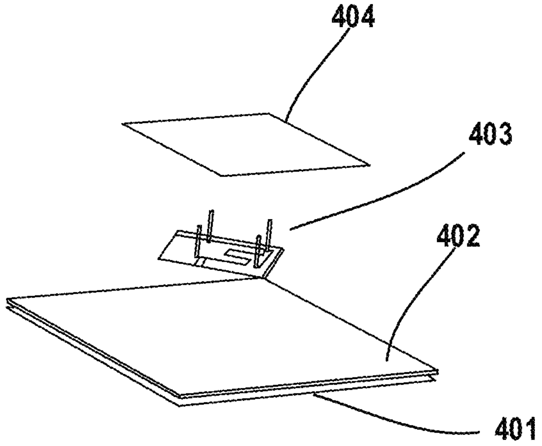
FIG. 4B illustrates an exploded perspective view of the antenna according to some example embodiments of the present disclosure.

Principle and implementations of the present disclosure will be described in detail below with reference to FIGS. 4A to 7. FIG. 4A illustrates a perspective view of an antenna 400 according to some example embodiments of the present disclosure. FIG. 4B illustrates an exploded perspective view of the antenna 400 according to some example embodiments of the present disclosure. For illustration, the antenna 400 is described by taking a patch antenna as an example.

The antenna 400 may comprise a substrate layer 401, a ground plane 402 formed on the substrate layer 401, a feeding network 403 formed on the ground plane 402, and a radiating element 404 formed on top of the substrate layer 401 and electrically coupled with the feeding network 403. The ground plane 401 may form the whole "ground plane" of an apparatus comprising the antenna 400. Alternatively, the ground plane 401 may form only a part of the overall ground plane of the apparatus. The radiating element 404 is configured to do the radiating when it is driven or fed, such that the radiating element is operational only when radio frequency (RF) circuitry, e.g. a transmitter, transmits a RF signal via the radiating element(s) and/or an electromagnetic signal is received by the radiating element(s) from the ether and coupled to RF circuitry, e.g. a receiver.

It should be noted that the number of the substrate layer, ground plane, radiating element and feeding network in FIG. 4A are given for the purpose of illustration without suggesting any limitations to the present disclosure. The antenna 400 may include any suitable number of the substrate layer and/or the ground plane and/or the radiating element and/or the feeding network adapted for implementing implementations of the present disclosure. Further, the arrangement of the substrate layer, ground plane, radiating element and feeding network is not limited to that shown, and any other suitable arrangements are also feasible. In addition, the antenna 400 may comprise additional components not shown and/or may omit some components as shown, and the scope of the present disclosure is not limited in this regard.

In some embodiments, the ground plane 401 may be formed from a metal plate having a first size, and the radiating element 404 may be formed from a metal plate having a second size smaller than the first size. Of course, the radiating element 404 may also be formed from a metal plate having a size larger than or equal to the first size, and the present disclosure does not make limitation for this. In some embodiments, the radiating element 404 may be a printed conductive layer (PCB) or a conductive layer formed on or provided by a plastic substrate such as a laser direct structuring (LDS) or molded interconnect device (MID). For example, the radiating element 404 may be a printed circuit board. In some embodiments, the substrate layer 401 may be a dielectric. Alternatively, the substrate layer 401 may be a PCB.

It should be noted that the above patch antenna is merely provided as an example, the feeding network according to the present disclosure can be applied to any other suitable forms of antenna. For example, the feeding network according to the present disclosure may be applied to one or more of the following antenna types, and not limited to these antenna types: a patch antenna, a dipole antenna, a slot antenna and all their variants, e.g., dielectric resonance antenna, folded dipole antenna, etc. The feeding network will be described below in details.

Figure 5:
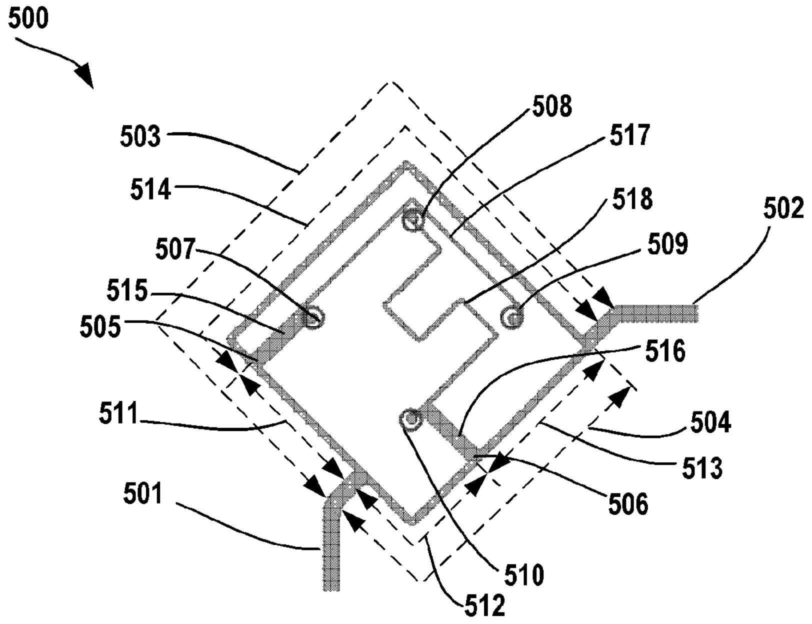
FIG. 5 illustrates a top view of a feeding network of an antenna according to some example embodiments of the present disclosure.

FIG. 5 illustrates a top view of a feeding network 500 of an antenna according to some example embodiments of the present disclosure. For convenience, it will be described in connection with FIG. 4. As shown in FIG. 5, the feeding network 500 comprises a first port 501 and a second port 502. In some embodiments, each of the first and second ports 501 and 502 may be configured to transmit and receive a signal. For example, each of the first and second ports 501 and 502 may convey a signal to be transmitted to the radiating element 404. Alternatively or additionally, each of the first and second ports 501 and 502 may convey a signal received from the radiating element 404 to a signal processing module for subsequent use.

As shown in FIG. 5, first feed line 503 and second feed lines 504 are coupled in parallel between the first and second ports 501 and 502 and formed into a continuous conductive loop. During an operation of the antenna 400, with the continuous conductive loop, a portion of the signal from the first port 501 to the second port 502 via the first feed line 503 and a portion of the signal from the first port 501 to the second port 502 via the second feed line 504 are cancelled at the second port 502. In this way, an isolation between the first and second ports 501 and 502 can be improved. In some embodiments, a portion of the signal from the second port 502 to the first port 501 via the first feed line 503 and a portion of the signal from the second port 502 to the first port 501 via the second feed line 504 may also be cancelled at the first port 501. In this event, the first and second ports 501 and 502 are decoupled, and the isolation between the first and second ports 501 and 502 can be further improved.

The feeding network 500 further comprises four feeders 507-510. The feeders herein may refer to antenna feed points. For convenience, the four feeders are also referred to as first, second, third and fourth feeders 507, 509, 510 and 508 as shown in FIG. 5. The four feeders 507-510 are used to electrically couple to the radiating element 404 and separate the radiating element 404 from the feeding network 500. These feeders may be a conductor in any suitable form, and may have different forms. The number of the feeders is not limited to four, and any other suitable number is also feasible.

Each of the first and second feeders 507 and 509 has one end coupled to a first node 505 on the first feed line 503 and the other end coupled to the radiating element 404. Each of the third and fourth feeders 510 and 508 has one end coupled to a second node 506 on the second feed line 504 and the other end coupled to the radiating element 404. In this way, the four feeders 507-510 will be simultaneously coupled and used to generate one beampattern.

In some embodiments, a first portion 511 of the first feed line 503 which extends from the first port 501 to the first node 505, a second portion 514 of the first feed line 503 which extends from the first node 505 to the second port 502, a first portion 512 of the second feed line 504 which extends from the first port 501 to the second node 506, and a second portion 513 of the second feed line 504 which extends from the second node 506 to the second port 502 may be set in electrical lengths to achieve the above cancellation of the signal. In this context, an electrical length is associated with a wavelength of the conveyed signal. For example, the electrical length may refer to a ratio of a physical length of a microstrip transmission line to a length of a transmitted electromagnetic wave (i.e., the wavelength of the conveyed signal).

In some embodiments, the above cancellation may be achieved when each of the first portion 511 of the first feed line 503, the first portion 512 of the second feed line 504 and the second portion 513 of the second feed line 504 have a first electrical length and when the second portion 514 of the first feed line 503 has a second electrical length equal to three times the first electrical length. For example, the first electrical length may be $\lambda/4$, and the second electrical length may be $\frac{3}{4}\lambda$, where $\lambda$ denotes the wavelength of the conveyed signal. It should be noted that this is merely an example, and any other suitable ways are also feasible to achieve the above cancellation of the signal.

In some alternative or additional embodiments, the four feeders 507-510 may be arranged symmetrically about a central axis (perpendicular to the paper in FIG. 5 and not shown) of the radiating element 404. Thereby, a symmetrical beampattern can be generated while a high isolation is provided.

In some alternative or additional embodiments, the four feeders 507-510 may be arranged to generate a beampattern with +45 degree or −45 degree polarization. In this way, two orthogonally polarized antennas can be achieved while a high isolation is provided. In some embodiments, the first and second feeders 507 and 509 may be arranged to be horizontally symmetrical about the central axis of the radiating element 404, and the third and fourth feeders 510 and 508 may be arranged to be vertically symmetrical about the central axis. In some embodiments, the first and second feeders 507 and 509 may be arranged to have a phase difference of 180 degrees with respect to the conveyed signal, and the third and fourth feeders 510 and 508 may be arranged to have a phase difference of 180 degrees with respect to the conveyed signal. In this way, a first vector field generated by the first and second feeders 507 and 509 and a second vector field generated by the third and fourth feeders 510 and 508 can be superposed into a beampattern with +45 degree or −45 degree polarization. The details will be described with reference to FIGS. 6 and 7.

Figure 6:
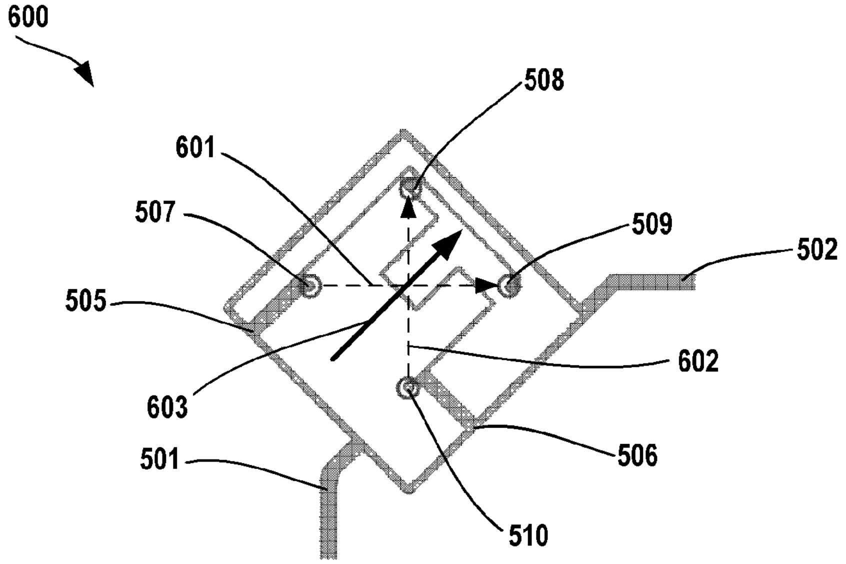
FIG. 6 illustrates a diagram of the generation of +45 degree polarized beampattern.

FIG. 6 illustrates a diagram 600 of the generation of +45 degree polarized beampattern. For convenience, it will be described with reference to FIG. 5. In this embodiment, a signal is to be transmitted from the first port 501. One portion of the signal from the first port 501 goes through $\lambda/4$ to the first node 505 and then arrives at the first and second feeders 507 and 509 with 180 degrees phase difference (for example, 0 degrees at the first feeder 507 and 180 degrees at the second feeder 509). In this event, a vector field 601 (a horizontal field) is generated by the first and second feeders 507 and 509 as shown in FIG. 6.

Accordingly, the other portion of the signal form the first port 501 goes through $\lambda/4$ to the second node 506 and then arrives at the third and fourth feeders 510 and 508 with 180 degrees phase difference (for example, 0 degrees at the third feeder 510 and 180 degrees at the fourth feeder 508). In this event, a vector field 602 (a vertical field) is generated by the third and fourth feeders 510 and 508 as shown in FIG. 6. As a result, the vector fields 601 and 602 are superposed into a +45 degree far field 603 as shown in FIG. 6.

In this embodiment, assuming that there is a portion of the signal that is drained from the first port 501 to the second port 502, i.e., there is a portion 1 of the signal transmitted from the first node 505 to the second port 502 and there is a portion 2 of the signal transmitted from the second node 506 to the second port 502. As the electrical lengths for portions 1 and 2 are the same, the signal portions 1 and 2 will be cancelled at the second port 502. In other words, no portion of the signal is drained from the first port 501 to the second port 502. Thus, the first and second ports 501 and 502 are decoupled.

Figure 7:
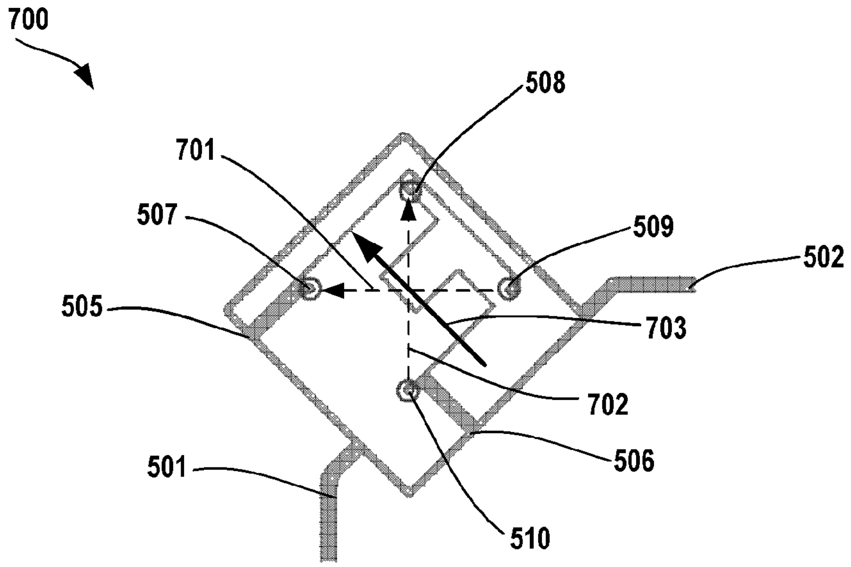
FIG. 7 illustrates a diagram of the generation of −45 degree polarized beampattern.

FIG. 7 illustrates a diagram 700 of the generation of −45 degree polarized beampattern. For convenience, it will be described with reference to FIG. 5. In this embodiment, a signal is to be transmitted from the second port 502. One portion of the signal from the second port 502 goes through 3λ/4 to the first node 505 and then arrives at the first and second feeders 507 and 509 with 180 degrees phase difference (for example, 180 degrees at the first feeder 507 and 360 degrees (i.e., 0 degrees) at the second feeder 509). In this event, a vector field 701 (a horizontal field) is generated by the first and second feeders 507 and 509 as shown in FIG. 7.

Accordingly, the other portion of the signal form the second port 502 goes through λ/4 to the second node 506 and then arrives at the third and fourth feeders 510 and 508 with 180 degrees phase difference (for example, 0 degrees at the third feeder 510 and 180 degrees at the fourth feeder 508). In this event, a vector field 702 (a vertical field) is generated by the third and fourth feeders 510 and 508 as shown in FIG. 7. As a result, the vector fields 701 and 702 are superposed into a −45 degree far field 703 as shown in FIG. 7.

In this embodiment, assuming that there is a portion of the signal that is drained from the second port 502 to the first port 501, i.e., there is a portion 1 of the signal transmitted from the first node 505 to the first port 501 and a portion 2 of the signal transmitted from the second node 506 to the first port 501. As the electrical lengths for the portions 1 and 2 are the same, the signal portions 1 and 2 will be cancelled at the first port 501. In other words, no portion of the signal is drained from the second port 502 to the first port 501. Thus, the first and second ports 501 and 502 are decoupled, and an isolation between the first and second ports 501 and 502 is effectively improved.

Returning to FIG. 5, in some embodiments, the first feeder 507 may be coupled to the first node 505 via a third feed line 515, and the third feeder 510 may be coupled to the second node 506 via a fourth feed line 516 having a same electrical length as the third feed line 515. In some alternative or additional embodiments, the second feeder 509 is coupled to the first node 505 via a fifth feed line 517, and the fourth feeder 508 is coupled to the second node 506 via a sixth feed line 518 having a same electrical length as the fifth feed line 517. In this way, the superposed far field radiation patterns generated by the four feeders 507-510 can form one beampattern with +45 degree or −45 degree polarization, as shown in FIGS. 6 and 7.

In some alternative or additional embodiments, the third and fifth feed lines 515 and 517 have a first common portion, and the fourth and sixth feed lines 516 and 518 have a second common portion, as shown in FIG. 5. The first common portion has a same electrical length as the second common portion. In this way, a more compact structure of an antenna can be achieved. It should be noted that the arrangement of the microstrips for the feed lines as shown in FIG. 5 is merely an example, and any other suitable arrangements are also feasible.

Figure 8:
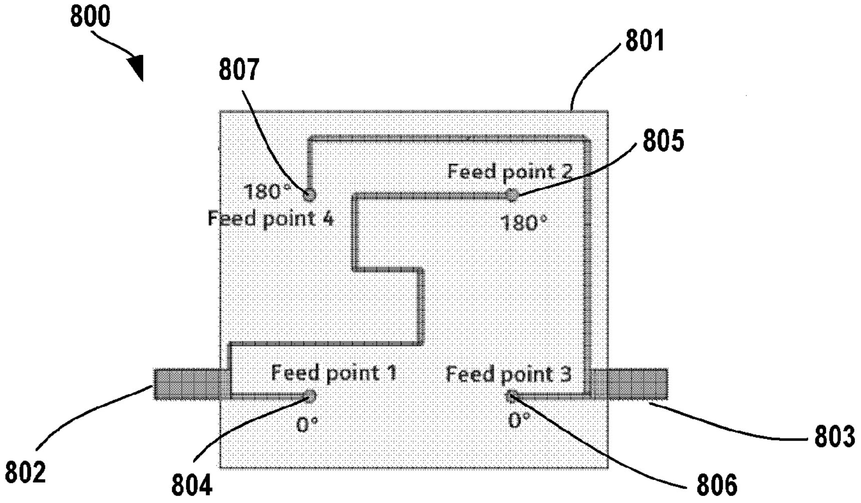
FIG. 8 illustrates a top view of a feeding network of a conventional solution.

The following description is made with reference to FIGS. 8 to 11B and which illustrates a comparison between feeding networks of the present antenna and the conventional antenna and advantages of the present antenna over the conventional antenna in terms of an isolation. FIG. 8 illustrates a top view of a feeding network 800 of a conventional solution. FIG. 9A illustrates a diagram 901 of +45 degree polarized beampattern, and FIG. 9B illustrates a diagram 902 of −45 degree polarized beampattern.

As shown in FIG. 8, the feeding network 800 comprises a first port 802 and a second port 803. Each of feeders 804 and 805 (denoted as Feed point 1 and Feed point 2) is connected to the first port 802, and each of feeders 806 and 807 (denoted as Feed point 3 and Feed point 4) is connected to the second port 803. During an operation, the feeders 804 and 805 have a phase difference of 180 degrees, and the feeders 806 and 807 have a phase difference of 180 degrees. The four feeders 804-807 are symmetrically arranged about a center axis of a radiating element 801.

Figures 9A, 9B:
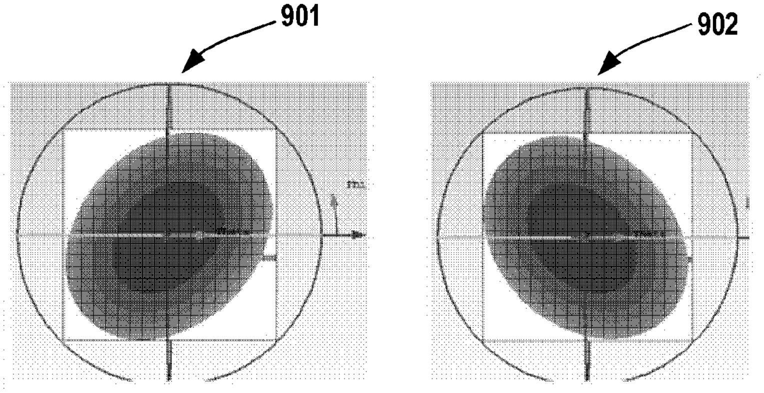
FIG. 9A illustrates a diagram of +45 degree polarized beampattern.
FIG. 9B illustrates a diagram of −45 degree polarized beampattern.

A signal from the port 802 only arrives at the feeders 804 and 805 and does not arrive at the feeders 806 and 807. In this case, a beampattern with a +45 degree polarization can be generated by the feeders 804 and 805, as shown in FIG. 9A. A signal from the port 803 only arrives at the feeders 806 and 807 and does not arrive at the feeders 804 and 805. In this case, a beampattern with a −45 degree polarization can be generated by the feeders 806 and 807, as shown in FIG. 9B.

Figure 10:
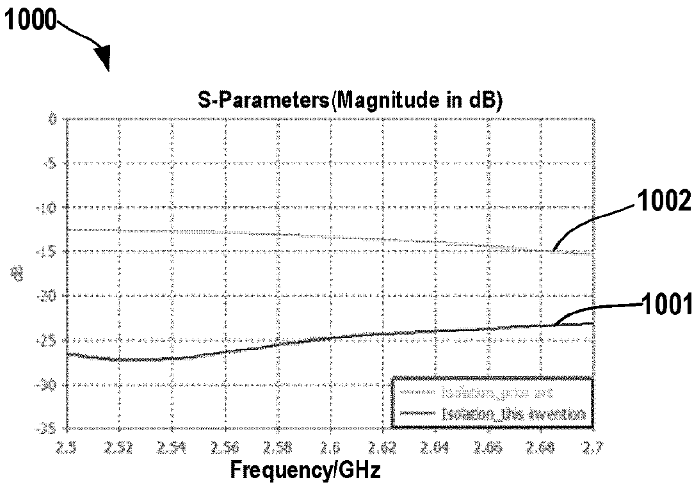
FIG. 10 illustrates a comparison diagram in terms of an isolation between antennas according to some example embodiments of the present disclosure and the conventional solution.

With the feeding network 500 shown in FIG. 5 and according to the present disclosure, the beampattern with ±45 degree polarization as shown in FIGS. 9A and 9B also can be generated. Comparing with the feeding network 800, the feeding network 500 according to the present disclosure can advantageously increase an isolation between two ports. FIG. 10 illustrates a comparison diagram 1000 in terms of an isolation between antennas according to some example embodiments of the present disclosure and the conventional solution.

As shown in FIG. 10, a curve 1001 denotes an isolation between the first port 501 and the second port 502 according to the present disclosure, and a curve 1002 denotes an isolation between the first port 802 and the second port 803 according to the conventional solution. The curves 1001 and 1002 are measured in a bandwidth from 2.1 to 3.1 GHz. It can be seen from the curves 1001 and 1002 that there is an isolation increase of at least dB over a bandwidth of antenna from 2.5 to 2.7 GHz (a bandwidth of 200 MHz) when the feeding network 500 is used. It should be noted that this is merely an example for illustration, the present application does not make any limitation for the bandwidth of antenna.

Figure 11A:
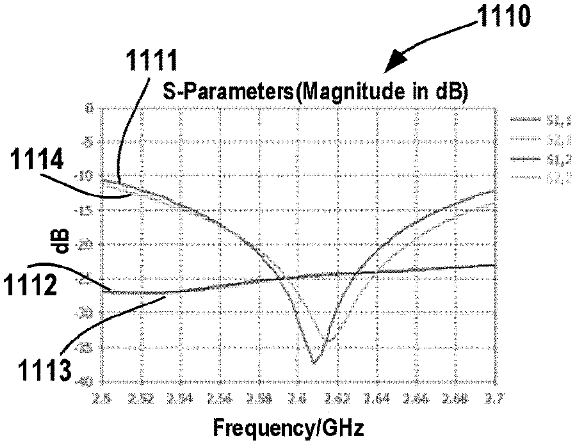
FIG. 11A illustrates a simulation result in terms of an isolation and a return loss according to some example embodiments of the present disclosure.
Figure 11B:
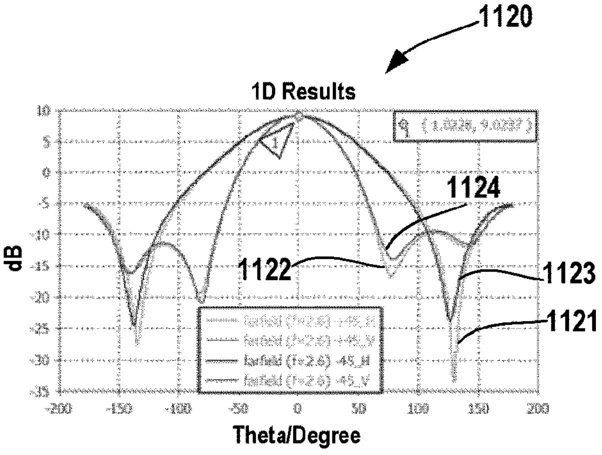
FIG. 11B illustrates a simulation result in terms of horizontal-plane and vertical-plane and ±45 degree polarizations according to some example embodiments of the present disclosure.

In addition, comparing with the feeding network 800, the feeding network 500 according to the present disclosure has no loss of gain, no increase in line loss, no increase in volume and weight, and no increase in cost. FIG. 11A illustrates a simulation result 1110 in terms of an isolation and a return loss according to some example embodiments of the present disclosure. FIG. 11B illustrates a simulation result 1120 in terms of horizontal-plane and vertical-plane and ±45 degree polarizations according to some example embodiments of the present disclosure.

As shown in FIG. 11A, a curve 1111 denotes an input return loss (S1,1), a curve 1112 denotes a gain (S2,1), a curve 1113 denotes an isolation (S1,2), and a curve 1114 denotes an output return loss (S2,2). It can be seen that the isolation is stable by −25 dB±2 from 2.5 GHz to 2.7 GHz. Further, the return loss is lower than −10 dB.

As shown in FIG. 11B, a curve 1121 denotes a 1D result of a far field radiation pattern with a horizontal-plane and +45 degree polarization, a curve 1122 denotes a 1D result of a far field radiation pattern with a vertical-plane and +45 degree polarization, a curve 1123 denotes a 1D result of a far field radiation pattern with a horizontal-plane and −45 degree polarization, and a curve 1124 denotes a 1D result of a far field radiation pattern with a vertical-plane and −45 degree polarization. It can be seen that the beampattern of +45° polarizations show a high consistency, whether horizontal-plane or vertical-plane.

So far, an antenna according to some embodiments of the present disclosure is described. With a continuous conductive loop in a feeding network of the antenna, an isolation between two ports is improved (compared to conventional feeding networks). With four feeders operated together, two vector fields are superposed so as to generate a beampattern with +45 degree or −45 degree polarizations. In addition, there is no loss of gain, no increase in line loss, and there is no increase in volume and weight. Further, there is no increase in cost.

Figure 12:
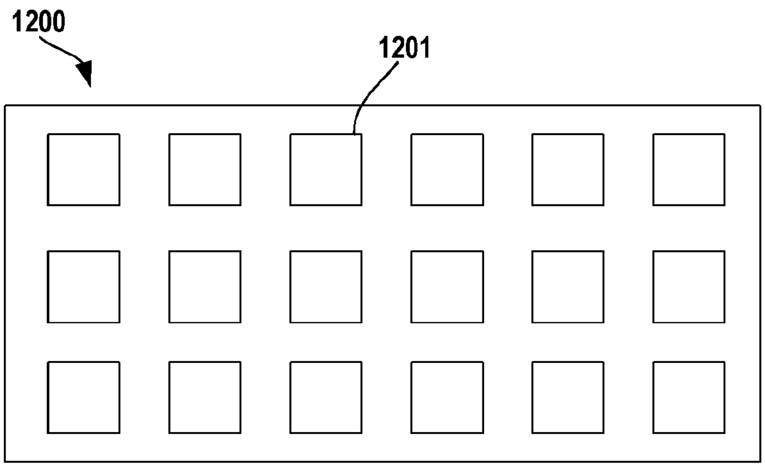
FIG. 12 illustrates a diagram of an antenna array according to some example embodiments of the present disclosure.

Correspondingly, embodiments of the present disclosure also provide an antenna array. FIG. 12 illustrates a diagram of an antenna array 1200 according to some example embodiments of the present disclosure. For convenience, it will be described in connection with FIGS. 4 and 5. As shown, the antenna array 1200 comprises a plurality of AEs 1201. The AE 1201 is formed by the antenna 400. The number of AEs 1201 is not limited to that shown, and can be any suitable number. Further, the antenna array 1200 may comprise additional components not shown and/or may omit some components as shown, and the scope of the present disclosure is not limited in this regard.

Figure 13:
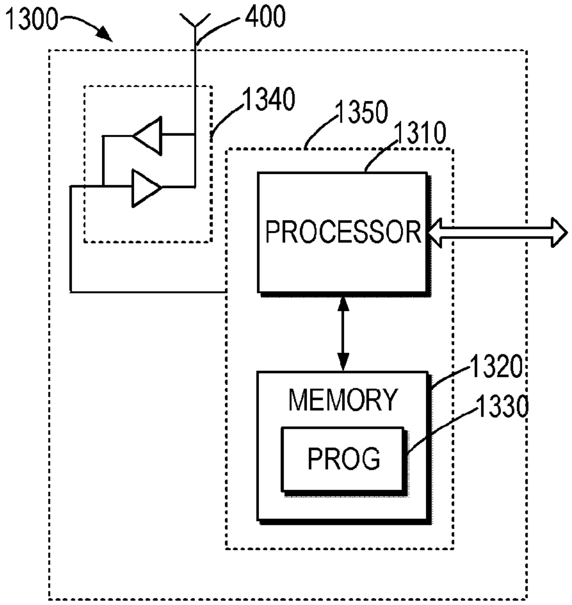
FIG. 13 illustrates a diagram of a communication device according to some example embodiments of the present disclosure.

Embodiments of the present disclosure also provide a communication device. FIG. 13 illustrates a diagram of a communication device 1300 according to some example embodiments of the present disclosure. The communication device 1300 can be implemented at or as at least a part of a network device or a terminal device.

As shown, the communication device 1300 includes a processor 1310, a memory 1320 coupled to the processor 1310, a suitable transmitter (TX) and/or receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna 400 or the antenna array 1200 to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

As an example, the embodiments of the present disclosure can be described in the context of the machine executable instruction which is included, for example, in a program module executed in a device on a target physical or virtual processor. Generally, the program module includes a routine, program, library, object, class, component, data structure and the like, which executes a particular task or implement a particular abstract data structure. In various embodiments, the functions of the program modules can be merged or split among the program modules described herein. A machine executable instruction for a program module can be executed locally or within a distributed device. In a distributed device, a program module can be located in both of a local and a remote storage medium.

Program code for carrying out methods of the present disclosure may be written in any combination of one or more programming languages. The program code may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, computer program code or related data can be carried by any appropriate carrier, such as an apparatus, device or processor can execute various processing and operations as described above. The example of the carrier includes a signal, a computer readable medium and the like. The example of the signal may include a signal broadcast electrically, optically, wirelessly, acoustically or in other forms, such as a carrier, an infrared signal and the like.

A computer readable medium may be any tangible medium that may contain, or store a program for use by or in connection with an instruction execution system, apparatus or device. The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It would be appreciated that features and functions of two or more devices according to the present disclosure can be implemented in combination in a single implementation. Conversely, various features and functions that are described in the context of a single implementation may also be implemented in multiple devices.

Although the present disclosure has been described with reference to various embodiments, it should be understood that the present disclosure is not limited to the disclosed example embodiments. The present disclosure is intended to cover various modifications and equivalent arrangements included in the spirit and scope of the appended claims.

What is claimed is:

1. An antenna, comprising:

a radiating element; and a feeding network coupled with the radiating element, the feeding network comprising:

first and second ports each configured to transmit and/or receive a signal;

first and second feed lines coupled in parallel between the first and second ports and disposed in a continuous conductive loop; and first and second feeders each configured to couple to a first node on the first feed line and to the radiating element, and third and fourth feeders each configured to couple to a second node on the second feed line and to the radiating element.

2. The antenna of claim 1, wherein the feeding network is configured such that when a signal is transmitted from the first port, a first portion of the signal from the first port is transmitted to the second port via the first feed line and a second portion of the signal from the first port is transmitted to the second port via the second feed line, the first and second portions of the signal are cancelled at the second port, and wherein when a signal is transmitted from the second port, a first portion of the signal from the second port is transmitted to the first port via the first feed line and a second portion of the signal from the second port is transmitted to the first port via the second feed line, the first and second portions of the signal are cancelled at the first port.

3. The antenna of claim 2, wherein a first portion of the first feed line which extends from the first port to the first node, a second portion of the first feed line which extends from the first node to the second port, a first portion of the second feed line which extends from the first port to the second node, and a second portion of the second feed line which extends from the second node to the second port are set in electrical lengths to achieve the cancellation.

4. The antenna of claim 3, wherein each of the first portion of the first feed line, the first portion of the second feed line and the second portion of the second feed line has a first electrical length, and the second portion of the first feed line has a second electrical length equal to three times the first electrical length.

5. The antenna of claim 4, wherein the first electrical length is one quarter of a wavelength of the signal, and the second electrical length is three quarters of the wavelength.

6. The antenna of claim 1, wherein the first to fourth feeders are configured symmetrically about a central axis of the radiating element.

7. The antenna of claim 6, wherein the first to fourth feeders are configured such that a first vector field generated by the first and second feeders and a second vector field generated by the third and fourth feeders are superposed into a beampattern with +45 degree or −45 degree polarization.

8. The antenna of claim 7, wherein the first and second feeders are configured to be horizontally symmetrical about the central axis of the radiating element, and the third and fourth feeders are configured to be vertically symmetrical about the central axis.

9. The antenna of claim 7, wherein the first and second feeders are configured to have a phase difference of 180 degree with respect to the signal, and the third and fourth feeders are configured to have a phase difference of 180 degree with respect to the signal.

10. The antenna of claim 7, wherein the first feeder is coupled to the first node via a third feed line, and the third feeder is coupled to the second node via a fourth feed line, the third and fourth feed lines having a same electrical length, and wherein the second feeder is coupled to the first node via a fifth feed line, and the fourth feeder is coupled to the second node via a sixth feed line, the fifth and sixth feed lines having a same electrical length.

11. The antenna of claim 10, wherein the third and fifth feed lines have a first common portion, and the fourth and sixth feed lines have a second common portion, and wherein the first and second common portions have a same electrical length.

12. An antenna array, comprising:

a plurality of antennas of claim 1.

13. A communication device, comprising the antenna array of claim 12.

* * * * *